United States Patent [19]
Bigt et al.

[11] 3,796,313
[45] Mar. 12, 1974

[54] DIALYSER APPARATUS

[75] Inventors: Leonardo Bigt, Libero Luppi, both of Mirandola, Italy

[73] Assignee: Sandoz Ltd., (A.K.A. Sandoz AG), Basle, Switzerland

[22] Filed: Dec. 15, 1972

[21] Appl. No.: 315,536

[30] Foreign Application Priority Data
Dec. 20, 1971 Italy .................................. 32657/71

[52] U.S. Cl. ............................................. 210/321
[51] Int. Cl. ........................................... B01d 31/00
[58] Field of Search ......................... 210/23, 22, 321

[56] References Cited
UNITED STATES PATENTS

| | | | |
|---|---|---|---|
| 3,627,137 | 12/1971 | Bier | 210/321 |
| 3,616,930 | 11/1971 | Muir | 210/321 |
| 3,547,271 | 12/1970 | Edwards | 210/321 |
| 3,362,540 | 1/1968 | Bluemle | 210/321 |
| 3,488,690 | 1/1970 | Ross et al. | 210/321 |
| 3,537,588 | 11/1970 | Backer | 210/321 |

*Primary Examiner*—Frank A. Spear, Jr.
*Assistant Examiner*—Ferris Lander

[57] ABSTRACT

A dialysis unit particularly suited to extra-corporeal haemodialysis having at least two dialysis membrane envelopes in overlapping relationship disposed in an enclosure. The envelopes constitute discrete flow passages for liquid to be dialysed and define with the enclosure a dialysate flow passage of sinuous configuration.

23 Claims, 6 Drawing Figures

DIALYSER APPARATUS

The present invention relates to dialysis units, particularly to extra-corporeal haemodialysis units.

The present invention provides a dialysis unit which comprises at least two dialysis membrane envelopes in overlapping relationship disposed in an hermetically sealed laminar enclosure, each envelope constituting a discrete flow passage for liquid to be dialysed, each envelope being rigidly secured over all but one of the edges thereof to the enclosure, the free edges of consecutive envelopes being in spaced apart relationship with respect to alternate sides of the enclosure to define a continuous dialysate flow passage between the enclosure and the envelopes of sinuous configuration, inlets and outlets being provided for the envelopes and the dialysate flow passage so arranged as to cause cross-flow of dialysate with respect to liquid to be dialysed.

Thus dialysate flow may proceed sinuously within the enclosure, initially along the section of the dialysate flow passage between one terminal envelope and the enclosure, then consecutively between the envelopes, and finally between the other terminal envelope and the enclosure.

Preferably the enclosure comprises two walls hermetically joined over the margins thereof and each envelope comprises a symmetrically folded sheet of dialysis membrane, the folded edge being the abovementioned free edge and the unfolded overlapping edges being secured to the enclosure by interposition thereof between the margins of the walls of the enclosure, such interposition effecting an hermetic seal of the envelope so formed. The margins of the walls may be provided with discrete sealing means to effect hermetic sealing between the margins of the walls and the envelopes. The discrete sealing means may comprise a pair of cooperating endless loops of resilient material each disposed in an endless groove extending around the margin of each wall.

Preferably, the dialysis unit is provided with terminal spacer means between the terminal envelopes and the enclosure to facilitate dialysis flow therethrough. The terminal spacer means may comprise an array of conical projections contacting the envelopes at the tips thereof. Conveniently, the conical projections of the array are symmetrically relatively disposed, e.g., the conical projections of the array may be so disposed as to define therebetween two, mutually perpendicularly extending, series of linear, parallel, unimpeded grooves, one series of grooves preferably being disposed in the direction of flow of liquid to be dialysed through the envelope, the arrangement tending advantageously to induce turbulance in the dialysate during dialysis.

In one form of dialysis unit, the terminal spacer means are formed integrally with the enclosure.

The diaylsis unit is preferably provided with intermediate spacer means between the envelopes, to facilitate dialysate flow therethrough. The intermediate spacer means may comprise a network structure consisting of two series of parallel and spaced apart filaments, one series crossing the other series, the network preferably being non-woven, the two series of filaments being bonded together. Preferably also, the one series of filaments cross the other series of filaments at an acute angle to provide a rhomboidal mesh. Conveniently, each series of filaments extend at an equal and opposite angle to the direction of flow of liquid to be dialysed in the envelopes. In one form of dialysis unit, the intermediate spacer means consists of a spacer assembly, the network being sandwiched between two outer nets, each outer net consisting of woven filaments, and being of substantially finer mesh than the sandwiched network. The outer nets may be of plain weave and of square mesh, and preferably the warp or weft filaments of the outer nets are disposed in the direction of flow of liquid to be dialysed through the envelopes, the assembly tending, advantageously, to induce turbulance in the dialysate during dialysis.

The inlet and outlet of the dialysate flow passage may comprise a distribution pipe and collection pipe respectively, each pipe extending substantially across a side of the enclosure and being perforated evenly over the length thereof to induce even distribution of dialysate.

The inlets and outlets for the liquid to be dialysed may each comprise a port having a tubular neck terminating at one end in a nipple portion and at the other end in a flattened head portion, the flattened head portion having a flattened bore that is gradually flared towards the end of the port, the flattened head portion being disposed within an envelope and being hermetically sealed therein at the neck.

Preferably, the enclosure is substantially of two-dimensionally flat form, (i.e., other than curved form as is the case in e.g., haemodialysis units of the coil type), although other forms of enclosure are contemplated.

When the enclosure is substantially of two dimensionally flat form, the interior peripheral zone of the enclosure is conveniently tapered substantially to a peripheral edge, the peripheral zone of the enclosure preferably being corrugated such that the lines of corrugation run normal to the peripheral edge.

For the purpose of haemodialysis, the unit is preferably of disposable form. To this end, the dialysis unit, apart from the dialysis membranes, are constructed of non-toxic plastics material. Thus, the dialysate inlets and outlets, are preferably constructed of polyvinyl chloride and the inlets and outlets for the liquid to be dialysed are preferably constructed of polyethylene. The dialysis membrane preferably consists of a cellulose film particularly the grade of cellulose produced by the copper oxide-ammonia process and sold under the trade name "Cuprophan." When a spacer assembly is employed, the net structure of the spacer assembly is preferably molded from an ethylene-vinylacetate copolymer, while the outer nets are of plasticized fiberglass.

Such a haemodialysis unit would be supplied sterilized and packaged for use.

One preferred embodiment of a dialysis unit of the invention will now be described in detail with reference to the accompanying drawings wherein.

Figure 1:
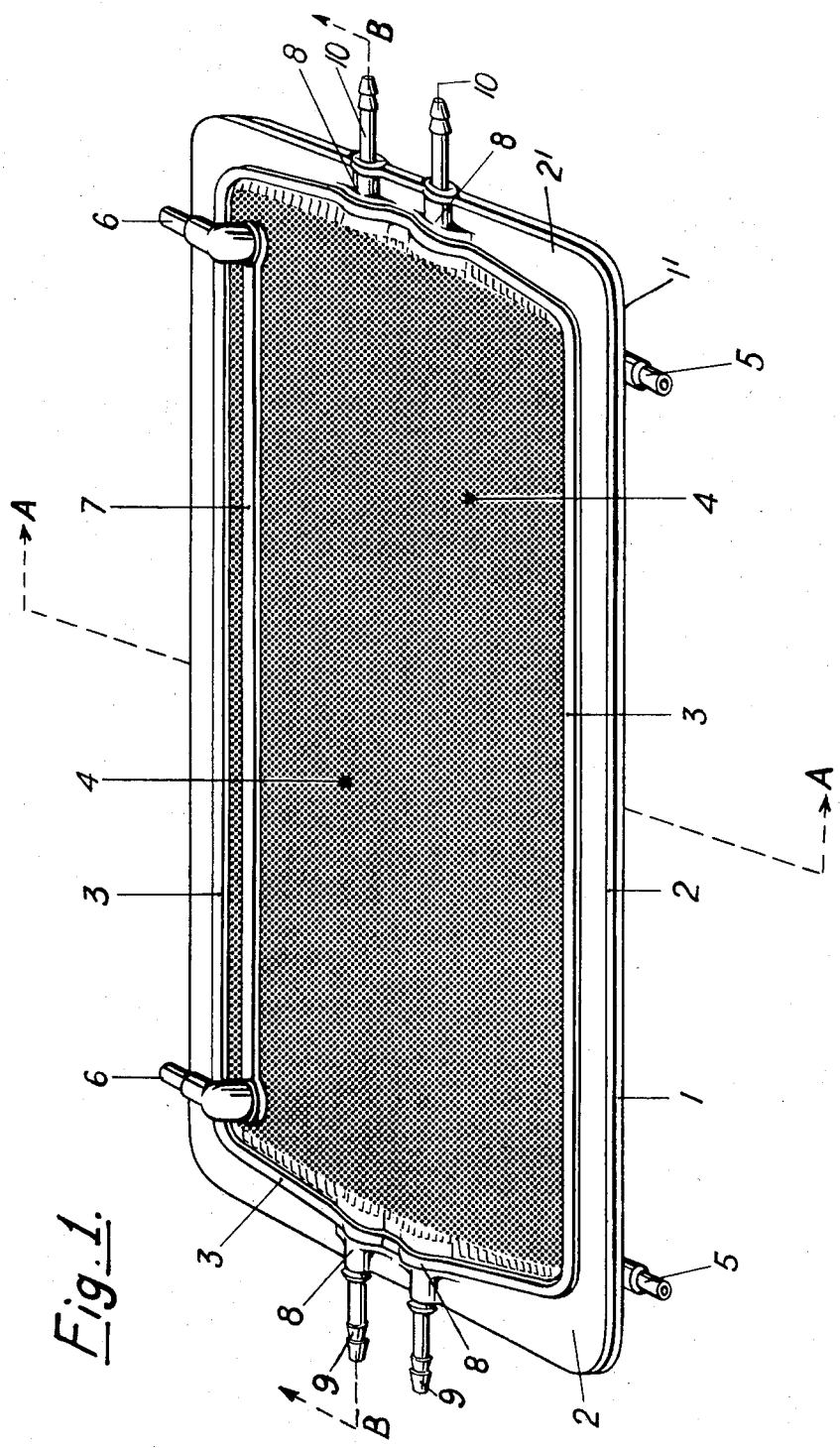
FIG. 1 is a perspective view of the dialysis unit.
Figure 2:
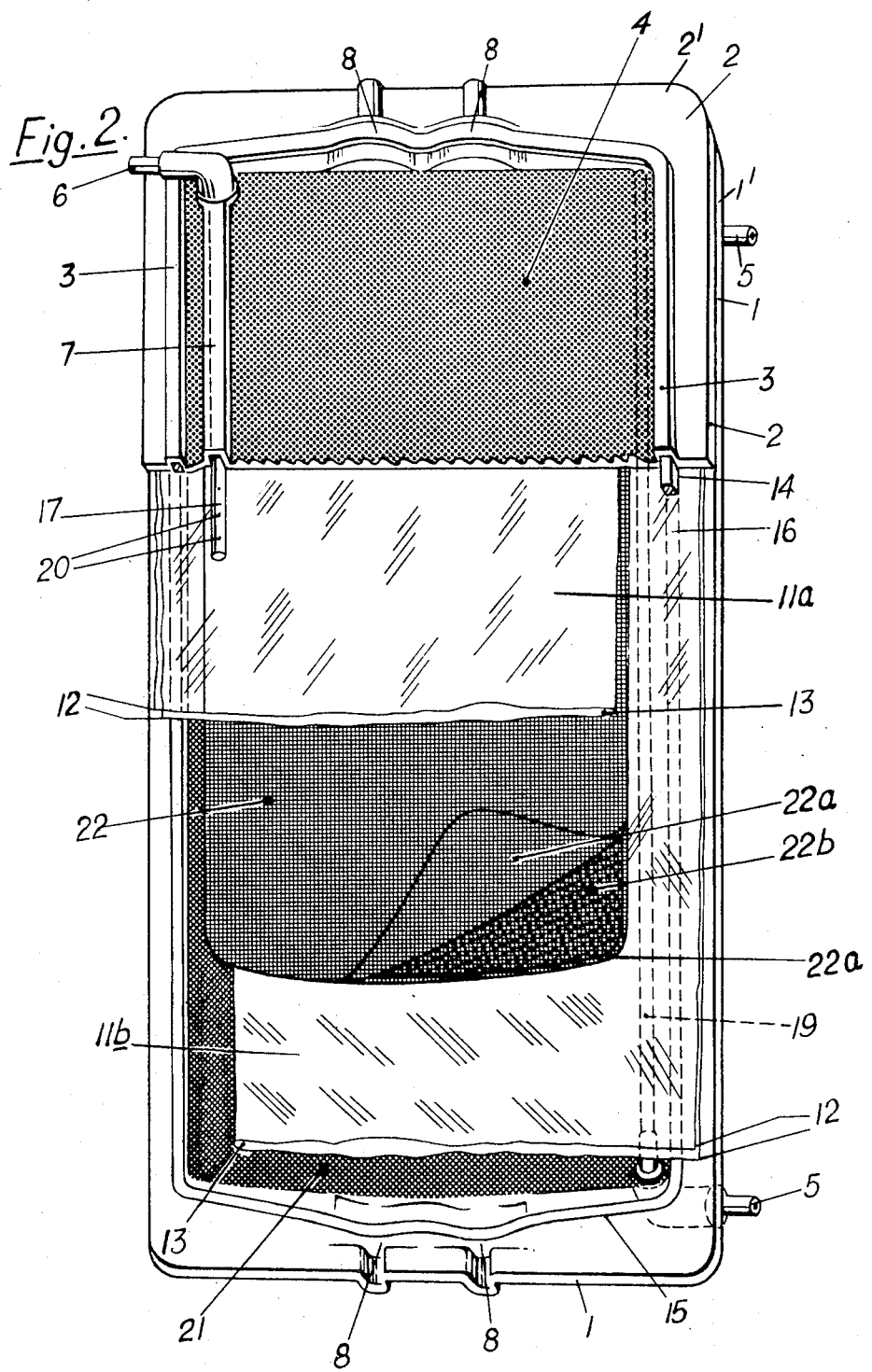
FIG. 2 is a part cutaway perspective view of the dialysis unit.
Figure 3:
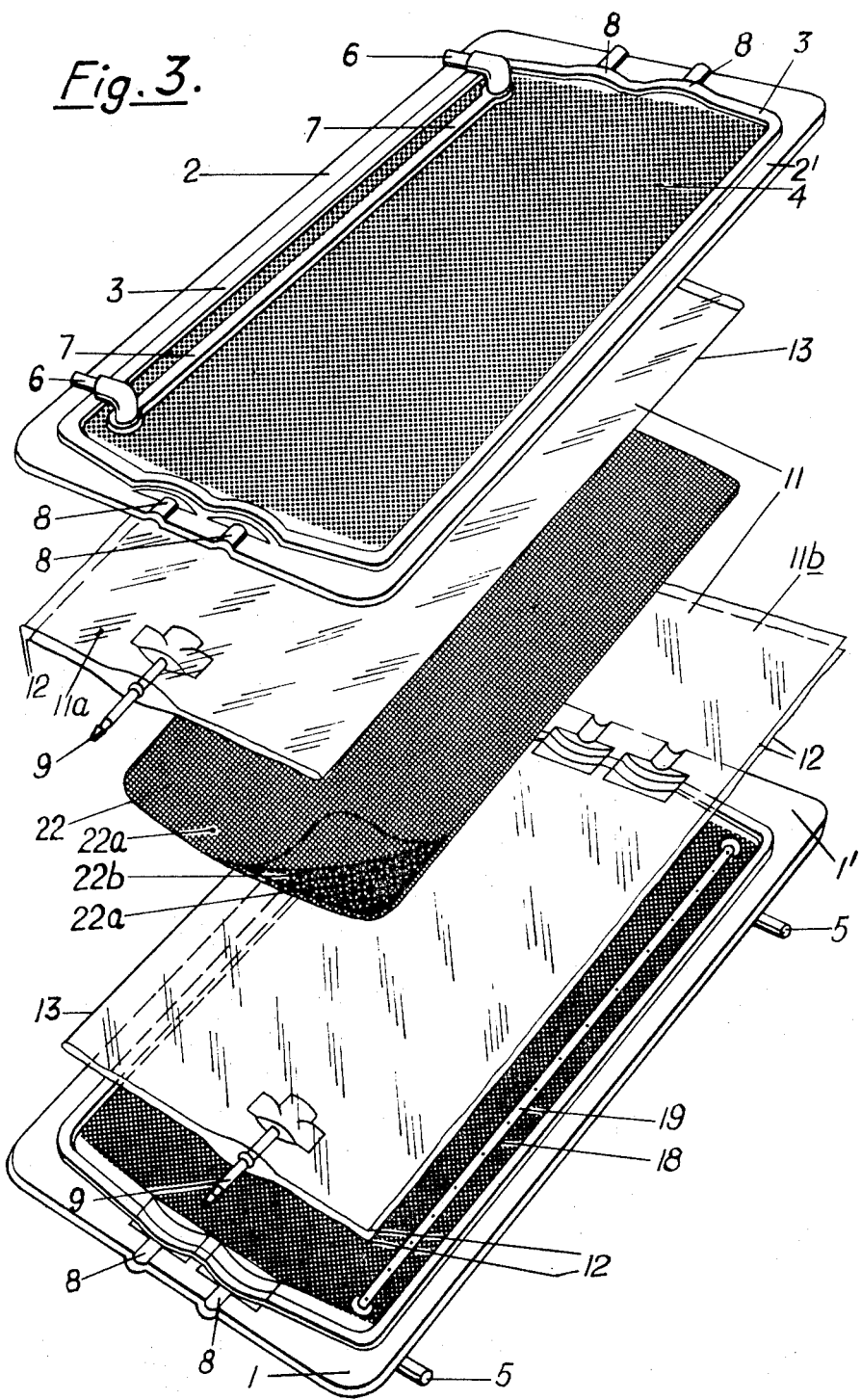
FIG. 3 is an exploded perspective view of the dialysis unit.

The dialysis unit of the preferred embodiment is designed for extra-corporeal haemodialysis. To this end, it is of sterilized, disposable, light-weight form intended to be supplied and handled in a protective, sealed plastics envelope. All components other than the membranes are of plastics material, the membranes comprising "Cuprophan" (Trade name) film (thickness 13.5 $\mu$).

Referring to the drawings, the unit comprises a rectangular laminar enclosure of two-dimensionally flat form. The enclosure comprises two walls in the form of plates 1 and 2. Each plate is formed with a rim 1' and 2' along the margin thereof, over which rims the plates are hermetically joined, e.g., by a radio frequency weld. The area of each plate encompassed by the rim is recessed such that in the assembled condition of the plates a laminar chamber is defined within the enclosure. As may be seen from FIGS. 5 and 6, the region of the plates adjacent the rims is sloped so that the peripheral zone of the laminar chamber tapers to a peripheral edge. This region is also corrugated, the lines of corrugation running normal to the edge of the laminar chamber. Each plate is impressed with an array of symmetrically relatively disposed conical projections 23, the projections being so disoposed as to define therebetween two, mutually perpendicularly extending series of linear, parallel, unimpeded grooves, one series of grooves extending parallel to the sides of the enclosure and the other series extending parallel to the ends of the enclosure. The projections constitute a terminal spacer means as will be described below.

Along one side of plate 1 and adjacent each end are disposed a pair of dialysate inlet ports 5, passing through the plate and being interconnected within the laminar chamber by a dialysate distribution pipe 19, extending the length of the chamber and being evenly perforated along the length thereof. In similar manner, along the side of plate 2 on the opposed side with respect to dialysate inlet ports 5 and distribution pipe 19, is disposed a pair of dialysate outlet ports 6, interconnected in the laminar chamber by a collection pipe 17. Since the dialysate inlets and outlets ports are indistinguishable and for other reasons to be explained below, it matters little which pair of dialysate ports are employed as the actual inlets and outlets, the only constraint being that the pair of ports employed as actual inlets be disposed beneath the plane of the enclosure as will be described below.

The rims 1' and 2' at each end of the plates 1 and 2 are each recessed to define a pair of symmetrically disposed spaced apart seats 8 to accommodate, in the assembled condition of the unit, a pair of blood inlet ports 9 and blood outlet ports 10 at each end of the enclosure.

An endless groove 3 and 16 formed in the rim of each plate, each groove accommodating an endless sealing loop, 14 and 15 respectively, of resilient material, the pair of sealing loops in the assembled condition of the unit, cooperating and serving as a discrete sealing means, being in opposed relationship over their lengths.

Between the plates 1 and 2, in the laminar chamber defined thereby, are disposed two dialysis membrane envelopes 11a and 11b in overlapping relationship, between which is sandwiched an intermediate spacer means in the form of a spacer assembly 22. Each dialysis membrane envelope comprises a rectangular sheet of dialysis membrane symmetrically folded lengthwise, the overlapping edges 12 being rigidly secured to the enclosure by interposition between the nip of opposed sealing loops 14 and 15 disposed in the grooves 3 and 16 in the rims of the plates, thus ensuring an hermetic seal along the overlapping edges of the envelopes. The envelopes 11a and 11b are so arranged that the folded or free edges 13 thereof are spaced apart from alternate, i.e., opposed, sides of the enclosure. The median axis of each envelope is thus offset to one or other side of the enclosure. Midway along the end of each envelope is disposed a blood inlet or outlet port, 9 or 10. The blood inlet and outlet ports 9 and 10 are of identical form and each comprises a tubular neck terminating at one end in a nipple portion, for connection to the blood line, and at the other end in a flattened head portion having a flattened bore that is gradually flared towards the end of the port to emerge as a slot. The flattened head portion of the port is disposed within the envelope, being hermetically sealed therein over the neck thereof by the nip of the sealing loops 14 and 15.

Figure 4:
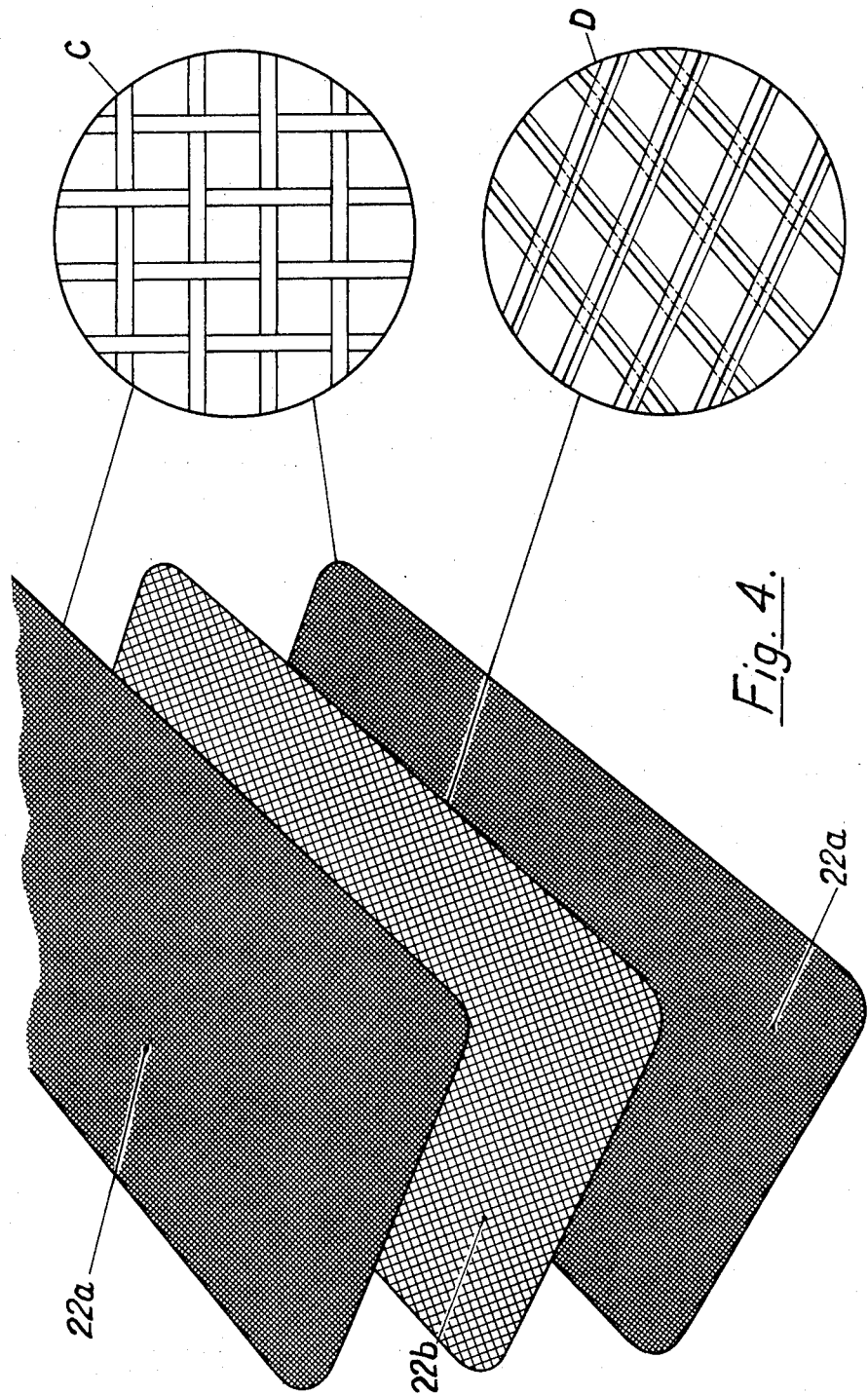
FIG. 4 is a diagrammatic exploded view of an interemdiate spacer assembly of the dialysis unit.

With particular reference to FIG. 4, the spacer assembly 22, sandwiched between the two envelopes, comprises a non-woven network structure 22b consisting of two series of parallel and spaced apart filaments, one series overlying and being bonded to the other series and crossing the other series at an acute angle to define a rhomboidal mesh, being shown in enlarged scale at D in FIG. 4. The two series of filaments extend at an equal and opposite angle to the sides of the enclosure. The spacer assembly 22 also includes a pair of outer nets 22a, between which the network structure is sandwiched, each net consisting of plain woven filaments of square mesh and being of substantially finer mesh than the rhomboidal mesh of the sandwiched network 22b. Either the warp or weft filaments of the nets, which are in fact indistinguishable apart from their disposition, are disposed parallel to the sides of the enclosure. A view of the nets on an enlarged scale is shown at C in FIG. 4. The nets are bonded together along their peripheries.

In the assembled condition of the unit, two discrete blood flow passages are defined by the two envelopes, the inlet and outlet ports 9 and 10 thereof defining the direction of blood flow. Thus, referring to FIG. 5, the direction arrows E are intended to indicate blood flow in or out of the plane of the Figure. It is to be noted that blood flow will always be parallel to the sides of the enclosure. The offsetting of the envelopes, one to each side of the enclosure, allows the blood inlets and outlets of each envelope to be centrally disposed in the end of the envelope, facilitating axial distribution of blood.

Figure 5:
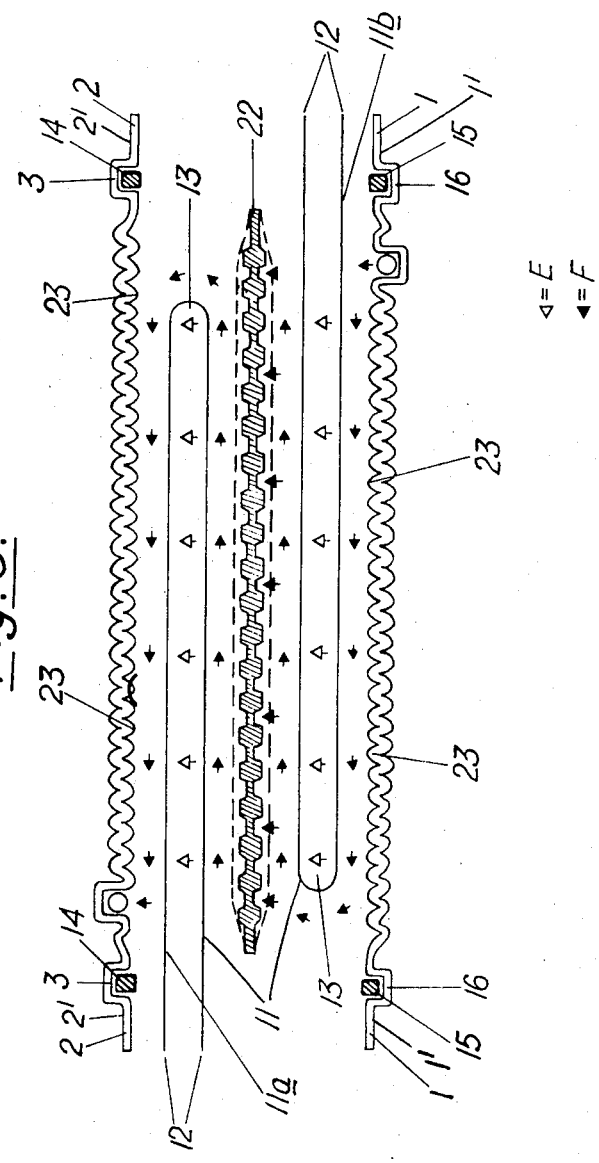
FIG. 5 is a diagrammatic section along the lines A—A of FIG. 1.
Figure 6:
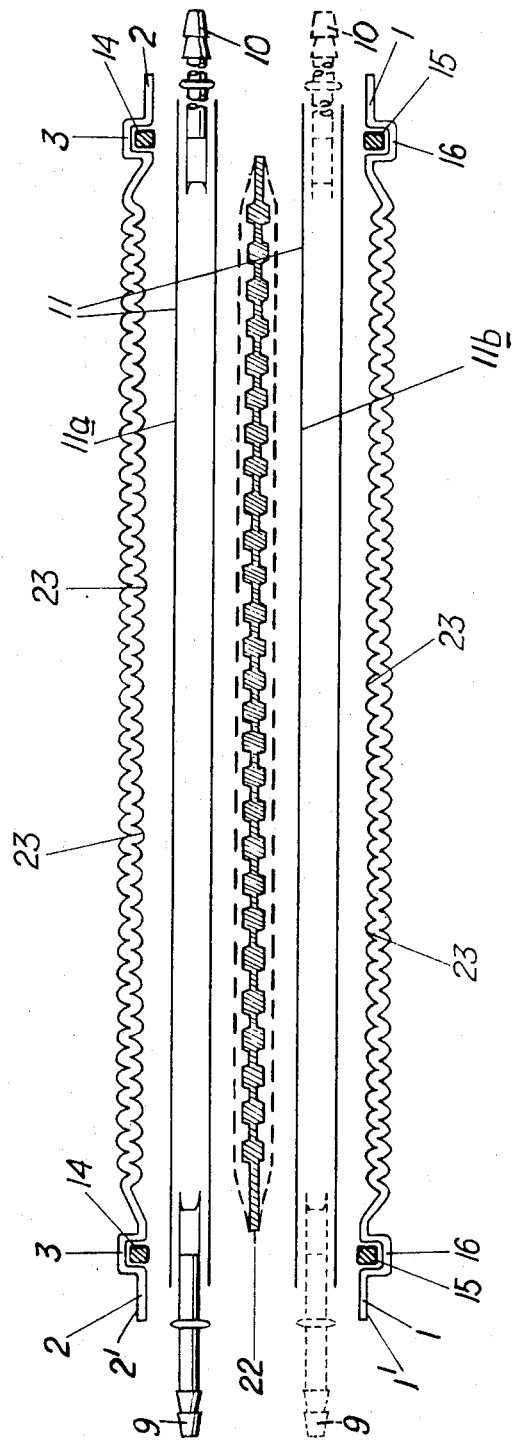
FIG. 6 is a diagrammatic section along the line B—B of FIG. 1.

The disposition of the envelopes within the enclosure also defines a continuous, sinuously extending dialysate flow passage, as between the envelopes and the enclosure, extending from the dialysate inlet ports 5 and distribution pipe 19, between plate 1 and envelope 11b, around the folded edge 13 of envelope 11b, between both envelopes 11a and 11b, around the folded edge 13 of envelope 11a and between envelope 11a and plate 2 to the dialysate collection pipe 17 and outlet ports 6, as may be clearly seen in FIG. 5, direction arrow F indicating the direction of dialysate flow. It is particularly to be noted that the flow direction of the dialysate in the dialysate flow passage will be cross-flow (as opposed to co- or counter-flow) with respect to the blood flow in the blood passage irrespective of which way round the dialysate or blood inlets and outlets are connected. The intermediate spacer means i.e., spacer assembly 22, and the terminal spacer means i.e., the array of conical projections 23 impressed in each plate, serve to locate the envelopes and to space the envelopes from each other and also from the plates to prevent constriction of the dialysate flow passage and thereby facilitate dialysate flow. Moreover, the form of the terminal spacer means i.e., conical projections, enables minimal yet uniform contact i.e., at the tips of the projections, with the envelopes, thus allowing a large dialysis exchange area of the envelopes. The intermediate spacer assembly 22 performs a similar function. In addition, the large mesh of the network structure 22b induces turbulance in the dialysate flow increasing the efficiency of dialysis, the formation of envelope pockets in the interstices of the network structure being resisted by the finer mesh of the outer nets 22a. The corrugated and tapered peripheral zone of the laminar enclosure defined by the plates, impedes the formation of blood pockets to maintain continuous blood flow over the width of the unit. This also facilitates draining of the unit after use.

A preferred method of use of the dialysis unit of the preferred embodiment in haemodialysis will now be described. It will naturally be appreciated that for such use, the unit will be in a sterilized condition.

The unit is placed in a haemodialyser housing of conventional and standard form whereby it may be adjustably clamped over the plates of the enclosure to avoid bulging of the unit during haemodialysis and to ensure a hermetic seal between the sealing loops. The dialysate line is connected to the pairs of dialysate ports by means of a Y-piece tube; the dialysate inlet being at the bottom of the unit and the outlet at the top to ensure upward movement of dialysate through the sinuous dialysate flow passage and thereby to expel any air within the dialysate flow passage. The unit is first primed with dialysate for this purpose. The housing, which is adjustable in disposition, is sloped before connection thereof to the blood line, such that one end of the unit is lowermost while being horizontal, and the unit primed with saline solution, again to expel the air, this time in the blood flow passage, the saline input being via the blood ports at the lowermost end of the unit (this pair of ports then being the blood inlet ports). It is to be noted that it is only the arrangement and disposition of the unit that determines whether the dialysate or blood ports are to be employed as inlets or outlets. It is also to be noted that the blood flow may either be concurrent or consecutive, i.e., the blood flow passages being connected either in parallel of in series, by suitable connection of the blood ports. For the present purposes, it is to be assumed that they are connected in parallel. Having expelled all air from the unit, and connected all auxiliaries, such as bubble-traps, in the blood line, the blood inlet ports are connected to the venous line and the blood outlet ports to the arterial line.

In a modification of the above described method particularly applicable to pediatric use, only one blood flow passage is employed and connected to the blood line, the other being primed with saline and the ports sealed. This, in fact, characterises the versatility of the unit, a rare advantage in a disposable unit.

The haemodialysis unit of the preferred embodiment is found in practice to possess the advantages of the traditional Kiil type disposable haemodialysis unit. In addition, further advantages are observed. Thus versatility is allowed as has been described above i.e., both normal and pediatric use is permitted. In addition, as has already been mentioned blood flow through the blood flow passages may be concurrent or consecutive i.e., the envelope may be connected in parallel or series, permitting a choice between higher efficiency and increased blood rate through the unit. Moreover, as will have been appreciated, the unit of the preferred embodiment operates on the principle of cross-flow of blood flow with regard to dialysate flow and thus the set of ports which are employed as inlets or outlets for blood or, as the case may be, dialysate, is not fixed, thus reducing the risk of mistake, as could for example exist in a unit operating on a co- or counter-flow principle. Furthermore, by virtue of the design of the various components of the unit, high dialysis efficiency together with uncomplicated blood flow, low internal resistance to blood flow and low blood volume of the unit, are permitted, thus reducing the possibility of coagulation and fibrin formation, the risk of blood damage and the volume of blood that is required for the operation of the unit. Yet another advantage of the unit is the ease with which the size of the envelope may be varied e.g., by simply trimming the overlapping edges of the membrane sheets opposite the folded edge, this advantage stemming from the manner of forming the envelopes i.e., by clamping the unfolded edges of the sheet between the rims of the enclosure plates.

To illustrate the convenient and lightweight form of the unit of the preferred embodiment, a unit of size 800 × 380 × 40 mm affords a total exchange surface area of the dialysis membrane of 9,500 cm$^2$ and weighs 1.6 kg. A unit of such dimensions competes favourably with traditional disposable haemodialysis units.

What is claimed is:

1. A dialysis unit which comprises an hermetically sealed laminar enclosure, at least two dialysis membrane envelopes in overlapping relationship disposed in the enclosure, each envelope constituting a discrete flow passage for liquid to be dialysed, each envelope being rigidly secured over all but one of the edges thereof to the enclosure, the free edges of consecutive envelopes being in spaced apart relationship with respect to alternate sides of the enclosure, to define a continuous dialysate flow passage, between the enclosure and the envelopes, of sinuous configuration, inlets and outlets being provided for the envelopes and the dialysate flow passage so arranged as to cause cross flow of dialysate with respect to liquid to be dialysed.

2. The dialysis unit of claim 1, wherein the enclosure comprises two walls hermetically joined over the margins thereof and each envelope comprises a symmetrically folded sheet of dialysis membrane, the folded edge being the free edge and the unfolded overlapping edges being rigidly secured to the enclosure by interposition thereof between the margins of the walls of the enclosure, such interposition effecting a hermetic seal of the envelope so formed.

3. The dialysis unit of claim 2, wherein said margins of the walls are provided with discrete sealing means to effect hermetic sealing between the margins of the walls and the envelopes.

4. The dialysis unit of claim 3, wherein said discrete sealing means comprises a pair of cooperating endless loops of resilient material each disposed in an endless groove extending around the margin of each wall.

5. The dialysis unit of claim 1,
having terminal spacer means between the terminal envelopes and the enclosure, to facilitate dialysate flow therebetween.

6. The dialysis unit of claim 5, wherein said terminal spacer means comprises an array of conical projections contacting the envelopes at the tips thereof.

7. The dialysis unit of claim 6, wherein the conical projections of the array are symmetrically relatively disposed.

8. The dialysis unit of claim 7, wherein the conical projections of the array are so disposed as to define therebetween two, mutually perpendicularly extending, series of linear, parallel, unimpeded grooves.

9. The dialysis unit of claim 8, wherein one series of grooves is disposed in the direction of flow of liquid to be dialysed through the envelope.

10. The dialysis unit of claim 5,
wherein the terminal spacer means are formed integrally with the enclosure.

11. The dialysis unit of claim 1,
wherein intermediate spacer means are provided between overlapping portions of the envelopes, to facilitate diaylsis flow therebetween.

12. The dialysis unit of claim 11, wherein said intermediate spacer means comprises a network structure consisting of two series of parallel and spaced apart filaments, one series crossing the other series.

13. The dialysis unit of claim 12, wherein the network structure is non-woven, the two series of filaments being bonded together.

14. The dialysis unit of claim 13, wherein the one series of filaments cross the other series of filaments at an acute angle.

15. The dialysis unit of claim 14, wherein each series of filaments extend at an equal and opposite angle to the direction of flow of liquid to be dialysed in the envelopes.

16. The dialysis unit of claim 12,
wherein the intermediate spacer means consists of a spacer assembly, the network structure being sandwiched between two outer nets, each outer net consisting of woven filaments, and being of substantially finer mesh than the sandwiched network.

17. The dialysis unit of claim 16, wherein the outer nets are of plain weave and of square mesh.

18. The dialysis unit of claim 16, wherein the warp filaments of the outer nets are disposed in the direction of flow of liquid to be dialysed through the envelopes.

19. The dialysis unit of claim 1,
wherein the inlet and outlet of the dialysate flow passage comprise a distribution pipe and collection pipe respectively, each pipe extending substantially across a side of the enclosure and being perforated evenly over the length thereof.

20. The dialysis unit of claim 1,
wherein the inlet and outlet for the liquid to be dialysed each comprises a port having a tubular neck, a nipple portion at one end and a flattened head portion at the other end, the flattened bore being provided in the flattened head portion that is gradually flared towards the end of the port, the flattened head portion being disposed within the envelope and being hermetically sealed therein at the neck.

21. The dialysis unit of claim 1, wherein the enclosure is substantially of two-dimensionally flat form.

22. The dialysis unit of claim 21, having an interior peripheral zone of the enclosure tapered substantially to a peripheral edge.

23. The dialysis unit of claim 22, wherein said peripheral zone of the enclosure is corrugated, the lines of corrugation running normal to said peripheral edge.

* * * * *